(12) United States Patent
Muno et al.

(10) Patent No.: US 7,660,801 B2
(45) Date of Patent: Feb. 9, 2010

(54) METHOD AND SYSTEM FOR GENERATING A SERIALIZING PORTION OF A RECORD IDENTIFIER

(75) Inventors: Andreas Muno, Hirschberg (DE); Gerhard Fuchs, Sinsheim (DE)

(73) Assignee: SAP AG, Walldorf (DE)

( * ) Notice: Subject to any disclaimer, the term of this patent is extended or adjusted under 35 U.S.C. 154(b) by 338 days.

(21) Appl. No.: 10/863,354

(22) Filed: Jun. 9, 2004

(65) Prior Publication Data

US 2005/0091293 A1  Apr. 28, 2005

Related U.S. Application Data

(63) Continuation-in-part of application No. 10/743,055, filed on Dec. 23, 2003, now Pat. No. 7,225,194.

(60) Provisional application No. 60/513,537, filed on Oct. 24, 2003.

(51) Int. Cl.
*G06F 7/00* (2006.01)

(52) U.S. Cl. .................. 707/100; 707/7; 707/1

(58) Field of Classification Search .................. 707/100, 707/7, 1
See application file for complete search history.

(56) References Cited

U.S. PATENT DOCUMENTS

| | | | |
|---|---|---|---|
| 6,457,006 B1 * | 9/2002 | Gruenwald | 707/7 |
| 6,886,018 B1 * | 4/2005 | Boudris et al. | 707/203 |
| 6,925,477 B1 * | 8/2005 | Champagne et al. | 707/203 |
| 7,013,298 B1 * | 3/2006 | De La Huerga | 707/3 |
| 2002/0174105 A1 * | 11/2002 | De La Huerga | 707/1 |
| 2003/0033278 A1 * | 2/2003 | Abe et al. | 707/1 |
| 2003/0177132 A1 * | 9/2003 | Thomas et al. | 707/100 |
| 2004/0078228 A1 * | 4/2004 | Fitzgerald et al. | 705/2 |
| 2004/0139072 A1 * | 7/2004 | Broder et al. | 707/4 |

* cited by examiner

*Primary Examiner*—Apu M Mofiz
*Assistant Examiner*—Cindy Nguyen
(74) *Attorney, Agent, or Firm*—Kenyon & Kenyon LLP (57) ABSTRACT

Embodiments of the present invention relate generally to software for automatically generating alphabetic or alphanumeric representations for assigning as serializing portions of record identifiers.

20 Claims, 6 Drawing Sheets

FIG. 1A

| Pos. | char. | Value | Mult | Mult. | Sum | Sum |
|---|---|---|---|---|---|---|
| 1 | 0 | 0 | 10 | 67600 | 0 | 0 |
| 2 | 0 | 0 | 10 | 6760 | 0 | 0 |
| 3 | A | 0 | 26 | 676 | 0 | 0 |
| 4 | A | 0 | 26 | 26 | 0 | 0 |
|   |   |   |   | 1 | 1 |   |

| 1 | 0 | 0 | 10 | 67600 | 0 | 675 |
|---|---|---|---|---|---|---|
| 2 | 0 | 0 | 10 | 6760 | 0 | 675 |
| 3 | Z | 25 | 26 | 676 | 650 | 675 |
| 4 | Z | 25 | 26 | 26 | 25 | 25 |
|   |   |   |   | 1 | 1 |   |

| 1 | 3 | 3 | 10 | 67600 | 20280 | 24310 |
|---|---|---|---|---|---|---|
| 2 | P | 15 | 26 | 6760 | 3900 | 4030 |
| 3 | 5 | 5 | 10 | 260 | 130 | 130 |
| 4 | A | 0 | 26 | 26 | 0 | 0 |
|   |   |   |   | 1 | 1 |   |

100  101  102  103  104  105  106

| Pos. | Char. | Value | Mult. | Mult. | Sum | Sum |
|---|---|---|---|---|---|---|
| 1 | Z | 25 | 26 | 308915776 | 297034400 | 308915775 |
| 2 | Z | 25 | 26 | 11881376 | 11424400 | 11881375 |
| 3 | Z | 25 | 26 | 456976 | 439400 | 456975 |
| 4 | Z | 25 | 26 | 17576 | 16900 | 17575 |
| 5 | Z | 25 | 26 | 676 | 650 | 675 |
| 6 | Z | 25 | 26 | 26 | 25 | 25 |
| | | | | 1 | 1 | |

METHOD AND SYSTEM FOR GENERATING A SERIALIZING PORTION OF A RECORD IDENTIFIER

CROSS-REFERENCE TO RELATED APPLICATIONS

This application claims the benefit of provisional application 60/513,537, filed Oct. 24, 2003. Moreover, this application is a continuation-in-part of U.S. application Ser. No. 10/743,055, filed Dec. 23, 2003 now U.S. Pat. No. 7,225,194. The foregoing applications are fully incorporated herein by reference.

FIELD OF THE INVENTION

Embodiments of the present invention relate to computer software for generating a serializing portion of a record identifier.

BACKGROUND INFORMATION

Records of all kinds often have some sort of unique identifier associated with them, so as to be able to distinguish one record from another. In computerized databases, the identifier is often a key used for retrieval of a particular record or records from the vast numbers of records that such databases can contain.

The needs or preferences of entities that maintain large databases of records may dictate particular, varying formats for record identifiers. Departments of governments, for example, may establish regulations mandating certain formats that can vary from department to department. The business world may have needs for record identifiers that vary in as many ways as individual businesses can vary. Businesses that do work pursuant to government contracts may in particular need to conform their record identification formats to government regulations. According to such regulations or other considerations, record identifiers might, for example, need to include mixtures of numbers and letters in specific combinations or sequences. For instance, for a group of related records, a part of their respective identifiers might be required to serialize the records to differentiate between records in the group.

Formats for record identifiers typically impose restrictions on the numbers of positions that can be assigned to respective parts of the identifiers. Such restrictions may be necessary, for example, due to space limitations on a form, or due to other factors. Whatever the reason for the restriction, if it is applied to a serializing portion of a record identifier, the restriction limits the number of unique combinations that can be represented. For example, assume that a government agency, the Agency of Large Databases (ALD), mandates a record identifier format for purchase orders as follows: department number-record creation month (in MMYY format)-project number-serial number of six digits. Thus, an example of a record identifier for the ALD might look as follows: ALD5-0604-035-000471. Here, the fields ALD5-0604-035 might be common to many records (all the purchase orders created in June of 2004 for project 035), while a serializing portion serial number of six digits differentiates between individual purchase orders. Because in this example the number of positions assigned to the serializing portion is six, the number of unique combinations that can be represented in terms of numbers alone is limited to one million (000000, 000001, 0000002; . . . , 999999).

However, the number of records in a database that need to be assigned unique serializing portions can easily exceed one million. Even if the serializing portion is allotted more positions—say, eight, or ten, or more—the number of unique representations possible with numbers alone is finite and may be exceeded by the number of records that need to be serialized. Accordingly, alphabetic representations (letter combinations) or alphanumeric representations (combinations of letters and numbers) may be used as an alternative to, or to supplement, strictly numeric representations of a serializing portion of a record identifier. Such alphabetic or alphanumeric representations may form some logical sequence that enables serialization of record identifiers in a way analogous to the way strictly numeric sequences can serialize record identifiers. For example, an alphabetic representation using three positions could be serialized as AAA, AAB, AAC, . . . , AAZ, ABA, ABB, . . . , ZZY, ZZZ. Or, for example, an alphanumeric representation of three positions could be serialized as AAA, AAB, . . . , AAZ, AA0, AA1, . . . , AA9, ABA, ABB, . . . , AB9, ACA, ACB, . . . , 99A, 99B, . . . , 999. Other arbitrary combinations of letters and numbers are possible that can function to serialize record identifiers.

Notwithstanding the advantages offered by alphabetic and alphanumeric combinations, processes to generate such combinations can be complex. Consider the following example. Assume the objective is to increase the number of unique combinations that can be made within four positions beyond 10,000 by using alphabetic and alphanumeric combinations as well as purely numeric combinations. A corresponding range might be defined as follows:

0001-ZZZZ

However, how counting should be performed within this range is not at all intuitively obvious. For example, suppose one counted, initially, by forming the strictly numeric combinations 0001, 0002, . . . , 0009. What the next combination should be is to a large extent arbitrary. For example, 000A is as reasonable a choice as 0010, given that letters are allowed within the range. Thus, one "logical" counting rule (based on an arbitrary desired usage) might look as follows:

0001-0009
0010-0099
0100-0999
1000-9999
000A-000Z
00AA-00ZZ
0AAA-0ZZZ
AAAA-ZZZZ.

However, a second counting rule that is just as logical (based on a different arbitrary desired usage) could look like:

0001-0009
000A-000Z
0010-0099
00AA-00ZZ
0100-0999
0AAA-0ZZZ
1000-9999
AAAA-ZZZZ.

In view of the above example, it may be understood that the question "what is the next combination in an alphabetic/alphanumeric sequence?" can be a difficult one to answer and depends on how the logic of the sequence is defined. It would of course be possible to write program logic to generate such sequences according to the respective needs of individual users, but executing the program logic to assign the serializing portions of record identifiers could be computationally expensive, especially in a large-scale and busy processing environment that generates many new records. Moreover, the latter approach requires coding a specialized solution for each individual user; a more generalized approach would be more efficient.

SUMMARY OF THE INVENTION

Embodiments of the present invention enable alphabetic and alphanumeric combinations to be generated and assigned as serializing portions of record identifiers efficiently and inexpensively. According to the embodiments, a mapping of ranges of alphabetic or alphanumeric combinations to a corresponding numeric sequence may be established. The mapping may be defined according to an arbitrary rule set up, for example, by a user. Alphabetic or alphanumeric combinations as defined by the rule may be generated and assigned as serializing portions of record identifiers, but a sequence of the alphabetic or alphanumeric combinations as they are generated and assigned may be maintained in strictly numeric terms. More specifically, when a next alphabetic or alphanumeric combination covered by the rule is to be assigned as a serializing portion, a next number in the corresponding numeric sequence may be determined, and the next number may be translated or converted based on the mapping to a corresponding alphabetic or alphanumeric combination, which is then assigned as the serializing portion. Because the sequence of the serializing portions is maintained by counting numerically, the computational costs associated with maintaining the sequence by "counting alphanumerically" are avoided. Moreover, although the mapping is individualized in that the ranges and letter/number combinations can be arbitrarily defined, the translation/conversion from a number to an alphabetic/alphanumeric combination can be performed by a generalized algorithm and does not require an individualized, per-user solution.

DETAILED DESCRIPTION

Embodiments of the present invention relate generally to software for automatically generating alphabetic or alphanumeric combinations for assigning as serializing portions of record identifiers. According to the embodiments, ranges of alphabetic or alphanumeric combinations defined according to an arbitrary rule may be mapped to a corresponding numeric sequence. Alphabetic or alphanumeric combinations as defined by the rule may be assigned as serializing portions of record identifiers. When a next alphabetic or alphanumeric combination covered by the rule is to be assigned as a serializing portion, a next number in the corresponding numeric sequence may be determined, and the next number may be translated/converted based on a runtime mapping to a corresponding alphabetic or alphanumeric combination, which is then assigned as the serializing portion.

A number of positions allotted to the serializing portion may be determined according to customizing format data. For example, the serializing portion may be a component of a composite record identifier as discussed above (i.e., the example department number-record creation month (in MMYY format)-project number-serial number of six digits, where components are separated by hyphens) whose overall format is determined according to the customizing format data.

The software according to embodiments of the invention may operate in conjunction with known software. For example, business software designed by SAP Aktiengesellschaft offers several standard functions in connection with record identifiers, including: storing and retrieving a current number in a numeric sequence within a specified range (referred to hereinafter as a "current number function"); determining the next number in the numeric sequence within the specified range (referred to hereinafter as a "next number function"); and determining whether a number is within a specified range.

Table 1, below, shows an example of information relating to record identifiers which could be maintained by a standard SAP system:

TABLE 1

| Range | Year | From Number | To Number | Current Number | External |
|---|---|---|---|---|---|
| 1 | 2003 | 000000000001 | 000000009999 | not applicable | yes |
| 1 | 2004 | 000000000001 | 000000009999 | not applicable | yes |
| 2 | 2003 | 000000010000 | 000000091599 | 10003 | no |
| 2 | 2004 | 000000010000 | 000000091599 | 10000 | no |

According to the information in Table 1, for the year 2003, a range of numbers between 1 and 9999 is reserved for external numbers. An external number is a number from an external source (e.g., supplied by a user or an application program as opposed to being internally generated by standard SAP software). The external numbers may be randomly assigned in any order to record identifiers so long as they are within the reserved range. Standard checks may be performed for such a range, so that, for example, if an attempt were made to externally assign a number that is not in the reserved range, it would not be permitted and an error message would be generated. A similar range of numbers is also reserved for external numbers for the year 2004.

On the other hand, a range of numbers between 10,000 and 91,599 is reserved for internally-generated numbers for the year 2003, and for the year 2004. The standard software may automatically generate numbers within these ranges sequentially, using a current number function and next number function as described above. For example, the number 10,003 for the year 2003 under the heading "Current Number" represents the last number generated in the sequence; this value may be maintained and retrieved using the current number function. Based on the last number generated, the next number function may automatically determine the next number in the sequence. Thus, in the example of Table 1, for range 2 and year 2003, if a number is to be automatically generated internally, the current number function of the standard software would have or would obtain the information that the last number generated was 10,003, and the next number function would therefore generate 10,004 as the next number in the sequence. The number 10,004 would then become the current number.

Table 2, below, shows another example of information relating to record identifiers which could be maintained by a standard SAP system:

TABLE 2

| Range | From | To | Current Number | External |
|-------|------|----|----|----------|
| LL | Z001 | ZZZZZZZZZ | not applicable | yes |
| XX | AAAAAAAAAA | YYYYYYYYYY | not applicable | yes |

In Table 2, range LL defines a range for allowed external alphabetic or alphanumeric combinations that could be used as serializing portions for record identifiers. The combinations could be governed by arbitrary rules determined by a user, but typically will exhibit some form of logical sequence within the defined range. For example, the LL range could allow arbitrary user-defined sub-ranges such as Z001-Z999, Z00A-Z99Z, Z0A0-Z9Z9, ZA00-ZZ99, ZAA0-ZZZ9, ZAAA-ZZZZ, Z0001-Z9999, ZZA001-ZZZ999 and so forth.

Similarly, range XX could allow arbitrary user-defined sub-ranges such as AAAAAAAAAA-AAAAAAAAAZ, AAAAAAAAA0-AAAAAAAAA9, ..., AAAAAAAABA-AAAAAAAAZZ, AAAAAAAAB0-AAAAAAAAZ9, AAAAAAAA00-AAAAAA99 and so on.

Table 2 further illustrates one example of an economy associated with "alphanumeric counting." That is, as indicated by "not applicable" under the "Current Number" column, and by the "yes" indication under the "External" column for both ranges LL and XX, standard functions provided for alphabetic and alphanumeric combinations may be limited to simply checking whether externally-generated combinations are within an allowed range, and not include "counting" within the ranges. For reasons well-understood by those skilled in the art, the piece of information, for example, "Z0A0 is within the LL range" is less expensive to obtain than the piece of information "what is the combination before Z0A0 based on some arbitrary counting rule?" or "what is the combination after Z0Z9 based on some arbitrary counting rule?"

Bearing in mind the costs of obtaining alphabetic/alphanumeric sequence information as in the above example, embodiments of the present invention extend the functions associated with alphabetic and alphanumeric combinations as shown in Table 2. According to the embodiments, alphabetic and alphanumeric combinations may be automatically generated in a sequence determined by an arbitrary rule. To automatically generate the combinations, a range of possible alphabetic or alphanumeric combinations may be associated with a range of numbers by the arbitrary rule. The rule may establish a mapping of each number in the number range with a corresponding alphabetic or alphanumeric combination. A last number generated within the number range may be determined. According to embodiments, a current number function as discussed above may be used for this operation.

To generate a next alphabetic or alphanumeric combination, the next number of the number range may be determined. In embodiments, the next number function as discussed above could be used for this operation. After the next number is determined, a corresponding next alphabetic or, alphanumeric combination of the alphabetic or alphanumeric range may be determined according to the mapping and assigned as a serializing portion of a record identifier.

An example of a rule, rule R1, is shown below:

Rule R1

| Line no. | Alpha from | Alpha to |
|----------|------------|----------|
| 1 | AAAAAA | ZZZZZZ |
| 2 | 100000 | 999999 |

The rule could be defined, for example, by a user of SAP software to fit his particular business needs where record identifiers are concerned. The rule could be stored along with a plurality of other rules in a customizing database, for example.

Rule R1 comprises two lines, 1 and 2. Each line defines a range with a start point and an end point. In line 1, the range is AAAAAA to ZZZZZZ, where AAAAAA is the start point and ZZZZZZ is the end point. In line 2 the range is 100000 to 999999, where 100000 is the start point and 999999 is the end point. A user could define the start and end points of a rule according to his choice and individualized needs. The start and end points could be defined as combinations of letters only, combinations of letters and numbers, or as combinations of numbers. Further examples are given in the following discussion.

Software according to embodiments of the present invention may read a rule and construct a corresponding runtime mapping. To construct the runtime mapping, the start and end points may each be translated or converted to numbers; these define an interval that is covered by a line. For example, a runtime mapping constructed for rule R1 might look as follows:

Runtime mapping corresponding to rule R1

| Line no. | Alpha from | Alpha to | Numeric from | Numeric to |
|----------|------------|----------|--------------|------------|
| 1 | AAAAAA | ZZZZZZ | 1 | 308915776 |
| 2 | 100000 | 999999 | 308915777 | 309815776 |

In the mapping, a corresponding numeric sequence, 1 to 308915776, has been associated with the alphabetic range of AAAAAA to ZZZZZZ defined by line 1 of rule R1. Thus, line 1 covers the numeric interval 1 to 308915776. Similarly, a numeric sequence, 308915777 to 319815776, has been associated with the range of line 2 of rule R1. Thus, line 2 covers the numeric interval 308915777 to 319815776. Cumulatively, the intervals of the rule as a whole cover the numeric range 1 through 319815776.

A conversion engine may perform the translation/conversion from the start and end points of a rule line to the corresponding endpoints of a numeric interval. The conversion engine may assign values to characters (letters and/or numbers) in the start/end points of the rule line to perform the conversion; the type (letter or number) and the position of a letter/number within the start/end point character string also figures into the conversion. The character A might be assigned the value 0 (zero), the character B the value 1, the character C the value 2, and so on up to Z, which is assigned the value 25. The value assigned each character may be multiplied by a base number or plurality of base numbers depending on the character's type and position and the results summed, in a way that is analogous to the decimal counting system (e.g., $317=3\times10^2$ plus $10^1\times10$ plus $7\times10^0$), to arrive at corresponding number.

Figure 1A:
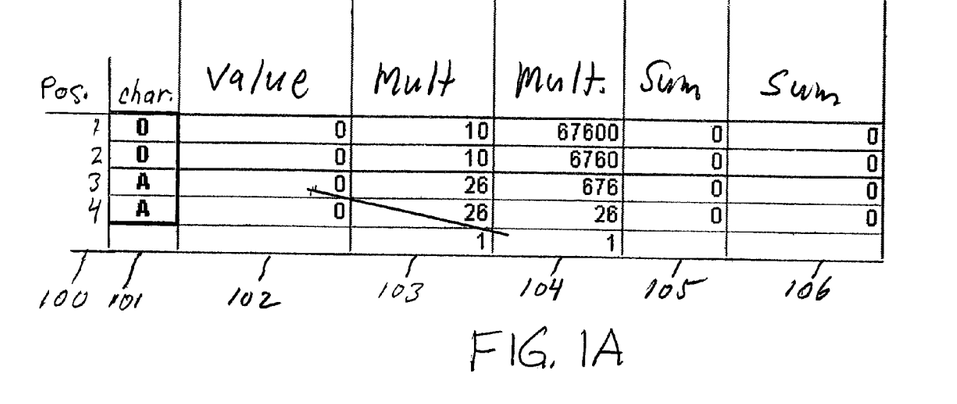
FIGS. 1A-1D show examples of operations of a conversion/translation algorithm according to embodiments of the present invention.

The foregoing process may be illustrated in matrix or tabular form, as shown in FIGS. 1A-1D. In FIG. 1A, position column 100 represents a position of a character in character string, in ascending order from left to right, and character column 101 shows the corresponding character in the string. A value column 102 represents a numeric value, 0, assigned the letter A. A first multiplier column 103 represents a base multiplier corresponding to the number of unique letters possible, 26, when the character type is a letter (as in positions 3 and 4), and the number of unique digits possible, 10, when the character type is a number (as in positions 1 and 2). A second multiplier column 104 represents successive multiplication operations as positions of the character string are evaluated. Sum columns 105 and 106 represent successive cumulative sum operations to arrive at the final result in the top right-hand corner. In FIG. 1A, the final result is 0.

Figure 1B:
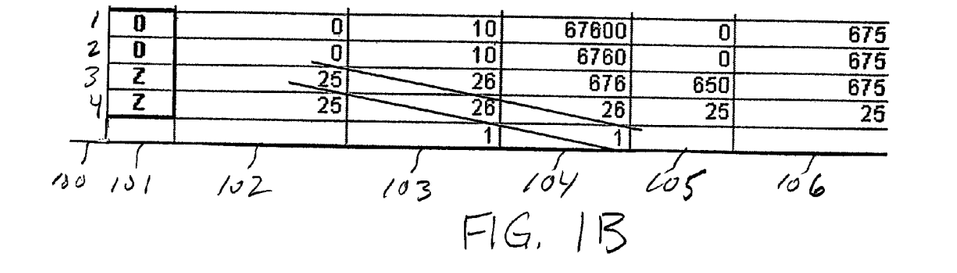
Figure 1C:
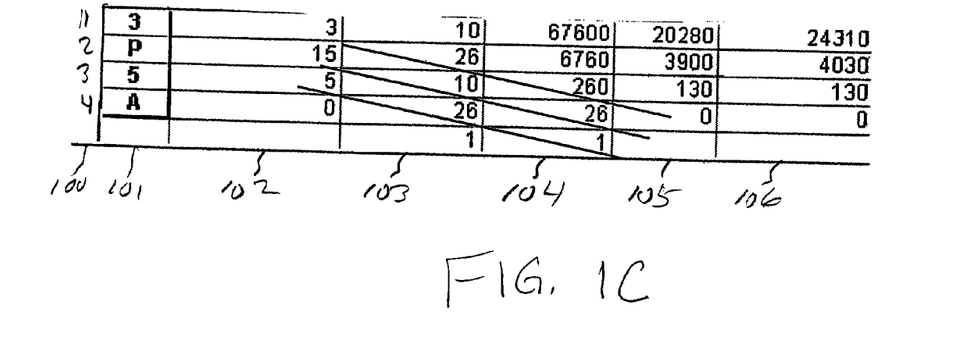

FIGS. 1B, 1C and 1D show additional examples. In FIG. 1B, for character string 00ZZ, the character value is 25 in positions 3 and 4, which each have base multipliers of 26 since they are letters. Positions 1 and 2 have base multipliers of 10 since they are numbers. Thus, 00ZZ is converted to 25×1 plus 25×26 equals 675. In FIG. 1C, for character string 3P5A, position 4 (character type letter) has a base multiplier of 26, position 3 (character type number) has a base multiplier of 10, position 2 (character type letter) has a base multiplier of 26, and position 1 (character type number) has a base multiplier of 10. Thus, as the positions are evaluated, 3P5A converts to 0×1 plus 5×26 plus 15×10×26 plus 3×26×10×26 equals 24,310.

Figure 1D:
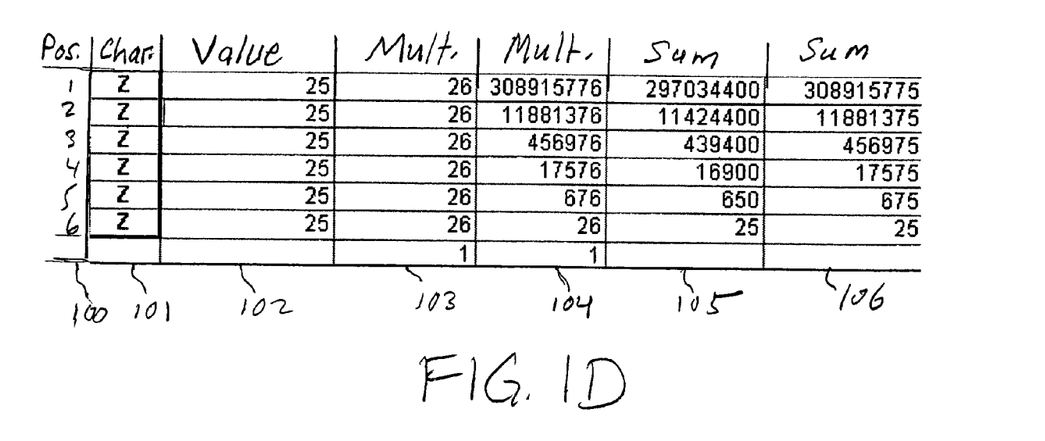

FIG. 1D represents a series of operations performed to convert the end point ZZZZZZ of line 1, rule R1, above, to a corresponding number, 308915775. As for the start point, AAAAAA, of line 1 of rule R1, because A's are assigned the value 0, the result for the same series of operations is of course 0, but as the assigned numeric number range has to start with a 1 (according to one convention observed in the examples discussed, record identifiers are not assigned the value "0"), during runtime, a normalization to '1' has to be performed as shown above in rule R1.

As described above, software according to embodiments of the present invention may construct a runtime mapping from a rule, where the rule defines intervals with start points and end points, each mapped to a corresponding number. To determine a next alphabetic/alphanumeric combination (or numeric combination if the interval happens to be defined as purely numeric as in line 2 of rule 1) covered by a rule, a next number may be determined, for example by a next number function as described above. When the next number is determined, it may be converted to the corresponding alphabetic/alphanumeric/numeric representation that lies within the interval to which the next number belongs.

If the interval defines purely numeric representations, the conversion may be performed by a simple addition or subtraction relative to the endpoints of the interval. E.g., referring to the example of rule R1, if the next number is 308915790, this places the next number in the second interval (Alpha from=100000 to Alpha to=999999). There is a difference of 23 between the mapped number 308915777 corresponding to the "Alpha from" endpoint and the next number. Thus, 23 can simply be added to the endpoint to obtain 1000023.

On the other hand, if the interval defines alphabetic or alphanumeric representations, the conversion may be performed by a process that is substantially the inverse of the process performed as discussed in connection with FIGS. 1A-1D, above. That is, positions in a definition of an interval may be assigned a type (letter or number) as described above. The number to be converted may be divided by a base divisor where the base divisor is 26 if the position is a letter and 10 if the position is a number. Then, the "modulo" function may be applied to the result. As is known, "a modulo b" means the remainder when a is divided by b. Thus, for example, 23 modulo 12 equals 11. If the position is designated to be a letter, the result of the modulo operation may be mapped to the corresponding letter of the alphabet, where the mapping maps A to 0, B to 1, . . . , and Z to 25. The result of an earlier division may then be divided by the base divisor corresponding to the next position, and so on until the end result is obtained.

Thus, for example, converting a four-position number to a corresponding alphanumeric representation, where the first (leftmost) position was designated to be a number, the second (next to the leftmost) position was designated to be a letter, the third (next to the rightmost) position was designated to be a number, and the fourth (rightmost) position was designated to be a letter, and the four position number was 1234, might involve the following operations:

1. Divide 1234 by 26, result is 47.462; apply modulo function, result is 12; fourth position is a letter, so apply mapping, result is M. M is assigned to the fourth position.

2. Divide 47.462 by 10, result is 4.746; apply modulo function, result is 7.461538462; 7 is assigned to the third position (don't need to map because the third position is a number).

3. Divide 4.746 by 26, result is 0.183; apply modulo function, result is 4.746153846; apply mapping, result is E. E is assigned to the second position.

4. Result of previous division equals or is less than one, so the first position is assigned a 0. Thus, 1234 is converted to 0E7M. Check result: 12×1 plus 7×26×1 plus 4×10×26×1=1234.

Below is shown an example of a more varied rule, rule R2, and the corresponding runtime mapping:

| Rule R2 | | |
|---|---|---|
| Line no. | Alpha from | Alpha to |
| 1 | AAAAAA | AAAAAF |
| 2 | AAAAA0 | AAAZZ9 |
| 3 | 999AA0 | 999ZZ9 |
| 4 | BCDAAA | ZZZZZZ |

| Runtime mapping corresponding to rule R2: | | | | |
|---|---|---|---|---|
| Line no. | Alpha from | Alpha to | Numeric from | Numeric to |
| 1 | AAAAAA | AAAAAF | 1 | 6 |
| 2 | AAAAA0 | AAAZZ9 | 7 | 6766 |
| 3 | 999AA0 | 999ZZ9 | 6767 | 13526 |
| 4 | BCDAAA | ZZZZZZ | 13527 | 296081246 |

Another example of a rule, rule R3, is shown below:

| Rule R3 | | | |
|---|---|---|---|
| Line no. | Alpha from | Alpha to | Exclude |
| 1 | 00001 | 99999 | |
| 2 | AAAAA | ZZZZZ | "I" and "O" |
| 3 | AA000 | ZZ999 | "I" and "O" |

Runtime mapping corresponding to rule R3:

| Line no. | Alpha from | Alpha to | Numeric from | Numeric to | Exclude |
|---|---|---|---|---|---|
| 1 | 00001 | 99999 | 0000000001 | 0000099999 | |
| 2 | AAAAA | ZZZZZ | 0000100000 | 0008062623 | "I" and "O" |
| 3 | AA000 | ZZ999 | 0008062624 | 0008638623 | "I" and "O" |

In rule R3, line 1 defines an initial numeric interval while lines 2-3 each defines an interval that associates a range of possible alphabetic or alphanumeric combinations with a range of numbers. Line 2 defines an interval specifying a range of possible alphabetic combinations between AAAAA and ZZZZZ, and corresponding numbers from 100,000 through 8,062,623. It may be noted that the number range for line 2 covers $24^5 = 7,962,624$ possible number combinations, as opposed to what might be the expected number of $26^5 = 11,881,400$ possible unique combinations for five positions and 26 letters. This is explained by noting that, according to embodiments of the present invention, elements may be selectively excluded from combinations. For example, if any two letters are excluded from the alphabet, there are only $24^5 = 7,962,624$ possible letter combinations in five positions. This is the situation illustrated in line 2 of rule R3. Line 2 illustrates excluding, for example, the letters "I" and "O" from allowed combinations. This might be desirable because the letters "I" and "O" can be easily confused with the numbers "1" and "0", respectively.

It may be appreciated in view of the above discussion that rules and their associated definitions allow for a nearly infinite variety of different combinations of letters and numbers to be generated and assigned as serializing portions in a sequence, but without needing individualized sequencing or "alphanumeric counting" logic for each application. Instead, applications can be customized by rule definitions, while the sequencing logic is performed by a fast, simple "next number" function and generalized conversion algorithm.

An illustrative example follows. Assume that a user of a computer system configured with software according to embodiments of the present invention is creating a new document, such as a purchase order. The user might create the new purchase order, for example, by entering values via a user interface comprising devices such as a keyboard/mouse and display monitor. As part of the creation of the new purchase order, software logic according to embodiments of the invention to generate a serializing portion of a record identifier of the new purchase order might be invoked automatically.

The logic to generate the serializing portion may consult an applicable rule, such as rules R1, R2 and R3 discussed above. The logic may determine what rule is applicable based on information obtained, for example, from a system context. Information such as a logon and other user inputs may provide such a system context. In the example under discussion, a purchase order is being created. Parameters relating to the purchase order, obtainable from user inputs or from system defaults, for example, may indicate a format of the record identifier to be created, and thus, a corresponding format for the serializing portion. The format may, in turn, be associated with an applicable rule.

A runtime mapping based on the applicable rule may be constructed and kept in memory. The mapping may map each alphabetic and/or alphanumeric combination covered by the applicable rule to a number. More specifically, the mapping may associate each of a start point and end point of an interval defined in the rule with a corresponding number, where the start point and end points may be alphabetic, alphanumeric, or numeric.

A last number within the cumulative numeric range covered by the applicable rule may be determined. For example, in rule R1, the cumulative numeric range of all the intervals is 1-317915776; in rule R2, the cumulative numeric range covered by all the intervals is 1-296081246; in rule R3, the cumulative numeric range covered by all the intervals is 1-8638623. Determining the last number within the cumulative numeric range could involve invoking the standard current number function discussed above. Then, based on the last number, a next number could be generated. This operation could also be provided as a standard system function, such as the next number function.

It may then be determined what interval, as defined by respective start and end points of each line, of the rule the next number lies within. Based on the interval that the next number lies within, the next number may be translated/converted to a corresponding alphabetic, alphanumeric or numeric representation within the interval. The alphabetic, alphanumeric or numeric representation may be assigned as the serializing portion of the record identifier.

For example, suppose rule R3 is the applicable rule. In ongoing processing of a computer system executing software according to embodiments of the present invention, various ones of the strictly numeric representations allowed by the initial range (line 1) of rule R3 might be sequentially assigned over the course of time to a plurality of record identifiers. At some point, however, all of the possible unique combinations within the numeric range of 1 through 99,999 could be exhausted. In such a situation, a new record identifier might need to be assigned a serializing portion, and the software would determine that the next number in a numeric sequence was 100,000, which is outside the range specified by line 1. Therefore, 100,000 would be translated/converted to AAAAA as required by line 2 (or simply read from the runtime mapping), and AAAAA would be assigned as the serializing portion. The next number would be 100,001, which would be translated/converted to AAAAB and assigned as a serializing portion, and then the next number 100,002, converted to AAAAC and assigned, and so on.

Similarly, all the alphabetic combinations within the interval of line 2 of rule R3 might eventually be assigned as serializing portions. In this event, a next number generated could be 8,062,624, and the interval defined by line 3 would take effect. Therefore, 8,062,624 would be translated to AA000 using the runtime mapping constructed based on the rule, and AA000 would be assigned as the serializing portion; then next number 8,062,625 would be converted to AA001, and so on.

Figure 2:
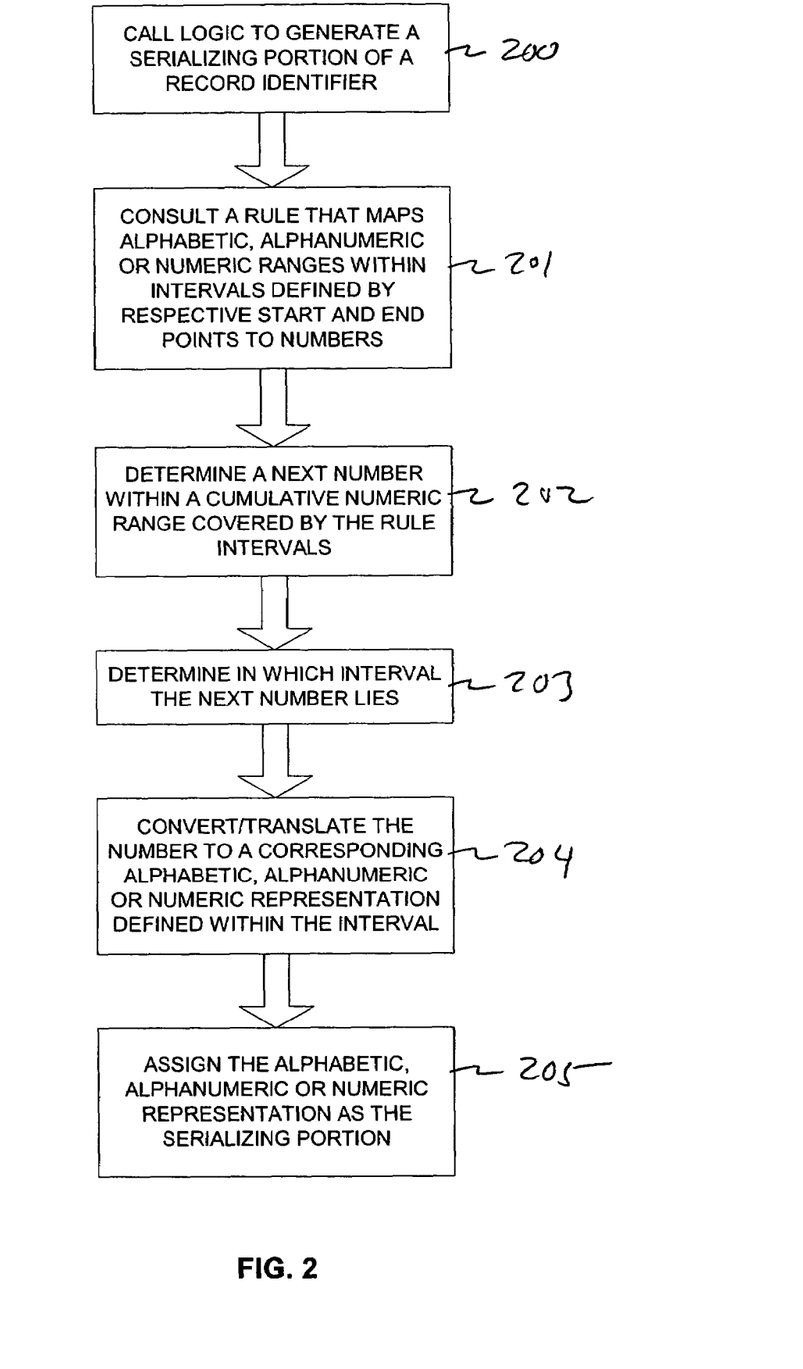
FIG. 2 shows a process flow according to embodiments of the present invention.

FIG. 2 shows a process flow for generating the serializing portion according to embodiments of the present invention. As shown in block 200, pursuant to an activity requiring creation of a new record identifier, logic to generate a serializing portion of the record identifier may be called or otherwise invoked.

As shown in block 201, the logic to generate the serializing portion may consult an applicable rule that maps alphabetic, alphanumeric or numeric ranges within intervals defined by respective start and end points to numbers A next number within the cumulative numeric range covered by the rule intervals may be generated, as shown in block 202. As shown in block 203, it may be determined where in the plurality of intervals defined by the rule the next number lies. The next number may then be converted/translated to a corresponding alphabetic, alphanumeric or numeric representation defined within the interval in which the next number is determined to lie, as shown in block 204. This alphabetic, alphanumeric or numeric representation may be assigned as the serializing portion of the record identifier, as shown in block 205.

Figure 3:
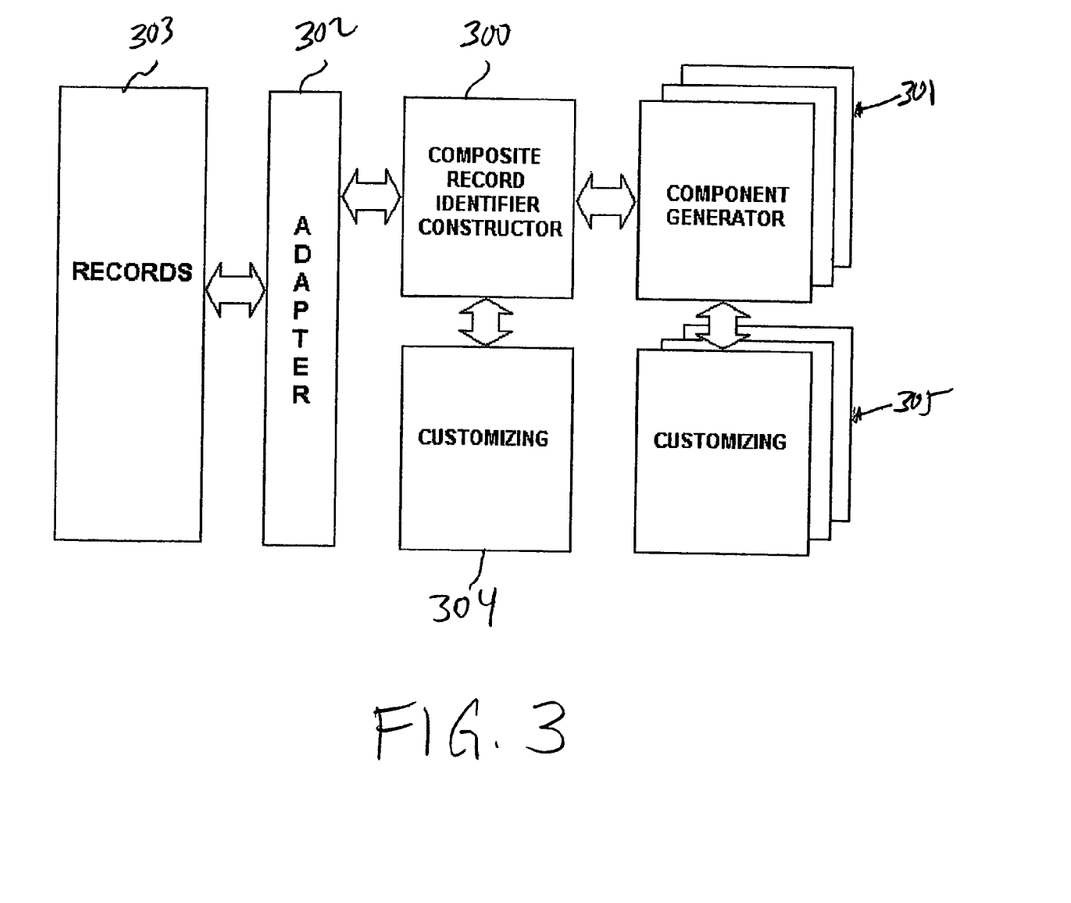
FIG. 3 shows elements of a system for constructing a composite record identifier according to embodiments of the present invention.

As discussed above, the serializing portion could be a component of a composite record identifier. Referring to FIG. 3, the composite record identifier including the serializing portion could be assembled by a general composite record identifier constructor 300 that is able to call and communicate with a plurality of component generators 301. The constructor 300 may communicate with a customizing data structure 304, and the component generators 201 may communicate with a customizing data structure 305. An adapter 302 may provide an abstraction layer between the constructor 300 and component generators 301, and records 303.

An example follows of constructing and assembling a composite record identifier including a serializing portion as described above. Assume that a government agency, the Agency of Large Databases (ALD), mandates a record identifier format (which will be referred to hereafter as format 1) for purchase orders as follows:

department number-record creation month (in MMYY format)-project number-serial number of six digits.

Thus, an example of a record identifier for the ALD might look as follows:

ALD5-0603-035-000471.

Figure 4:
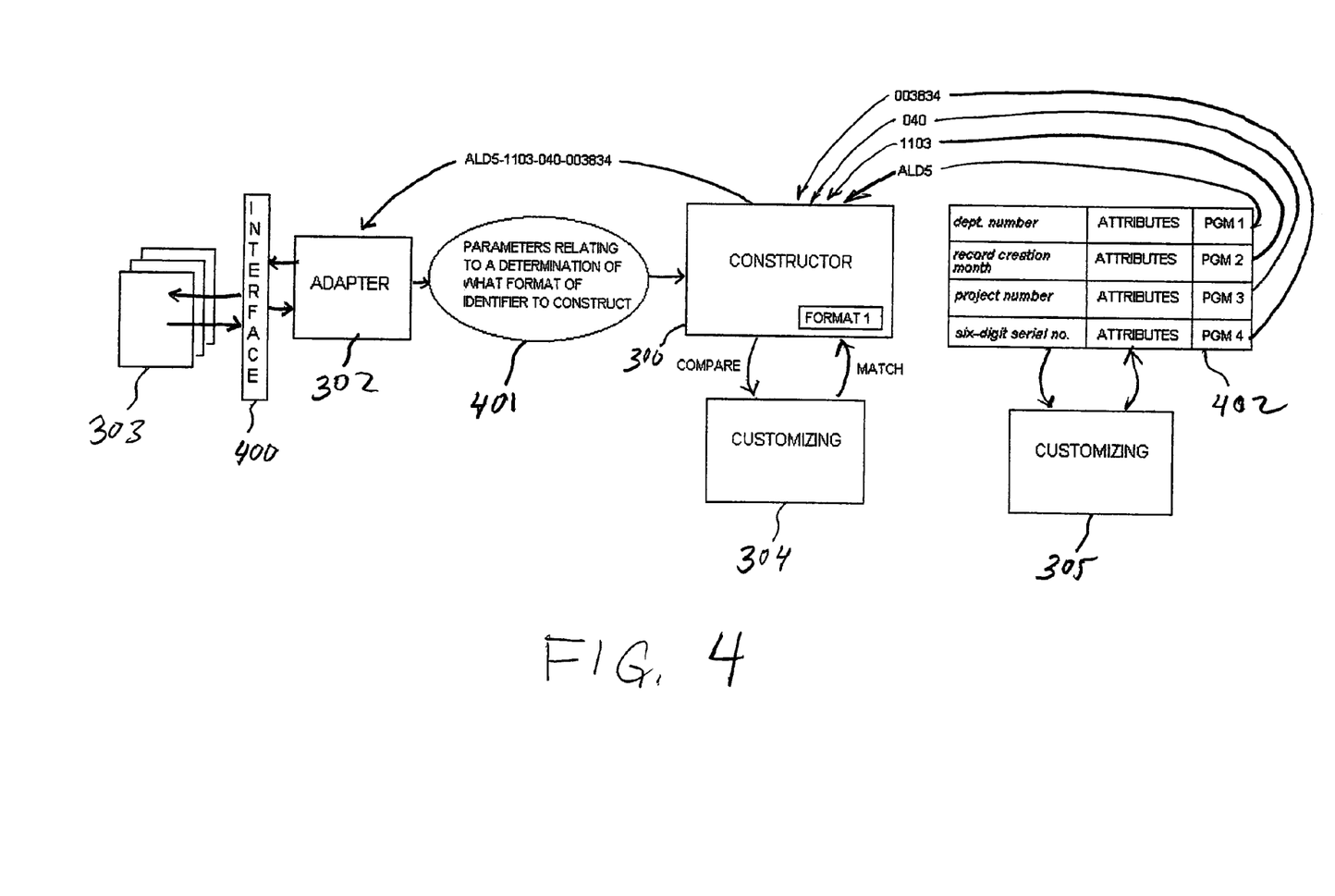
FIG. 4 shows a data flow in a system according to embodiments of the present invention.

Now assume that a user in department 5 (ALD5) of the ALD wants to create a new purchase order record. The user might proceed to call up a display of a user interface for performing operations relating to ALD records, and enter values to cause the purchase order to be created. As part of the creation of the new purchase order, software according to embodiments of the invention to generate a composite record identifier of the new purchase order might be invoked. Referring to FIG. 4, the software may call adapter 302, which may obtain, via an interface 400 therewith and/or via a system context, information relating to records 303 of the ALD. The interface 400, for example, could comprise a plurality of function calls via which data can be requested by and returned to the adapter. The information passed by the adapter to the constructor may include parameters 401 based on which the constructor makes a determination of what kind of identifier to build. For example, the information may include an organizational parameter (e.g., the record is being created for ALD5), a factual parameter such as a classification of a record type, a record type parameter identifying what kind of record the identifier is for (e.g., a purchase order, a contract, a bid invitation, a sales order) and a relational data parameter (e.g., a parameter concerning a contract that the purchase order is being created pursuant to).

Based on the parameters passed by the adapter, the constructor 300 may make a determination as to what kind of identifier to construct. More specifically, the constructor 300 may compare the parameters to entries in configurable tables in the customizing data structure 304 to determine the format. Assume that based on the parameters passed by the adapter 302, the constructor 300 determines that a record identifier of format 1 (see above) should be constructed. Referring to FIG. 4, the constructor may then call component generators 301 to build individual components of the identifier. As described previously, each component generator could be a specific program that is called to build a corresponding component and return it to the constructor. Names of the component generator programs could be stored, for example, in a table 402 as shown in FIG. 4, along with corresponding component identifiers. Thus, based on the entry for component department number in the table, the constructor might call corresponding program PGM 1. PGM 1 may execute and return "ALD5" to the constructor. To determine the appropriate department number, PGM 1 might use information, such as organizational information, obtained by the adapter 302 from records 303 and forwarded to PGM 1 by the constructor 300. Further, PGM 1 might consult customizing data structure 305 to obtain customer-specific information as described previously.

Similarly, based on the entry for record creation month in the table, the constructor might call PGM 2, which would execute and return, say, "1103" to the constructor. Based on the entries for project number and serial number of six digits, PGM 3 and PGM 4 might each execute and return, say, "040" and "003834", respectively. Each of PGM 3 and PGM 4 may utilize in its execution information obtained by the adapter 302 and forwarded by the constructor 300. Moreover, PGM 4 may include logic for assigning an alphabetic or alphanumeric representation for the serial number of six digits in accordance with a rule as described previously. Further, each of PGM 3 and PGM 4 may consult customizing data structure 305 to obtain customer-specific information.

The constructor 300 may assemble the components returned to it by the component generators into a composite record identifier, and return it to the adapter 302. The composite record identifier could, as noted earlier, be displayed in a user interface and saved into a corresponding record on a database, for example.

Figure 5:
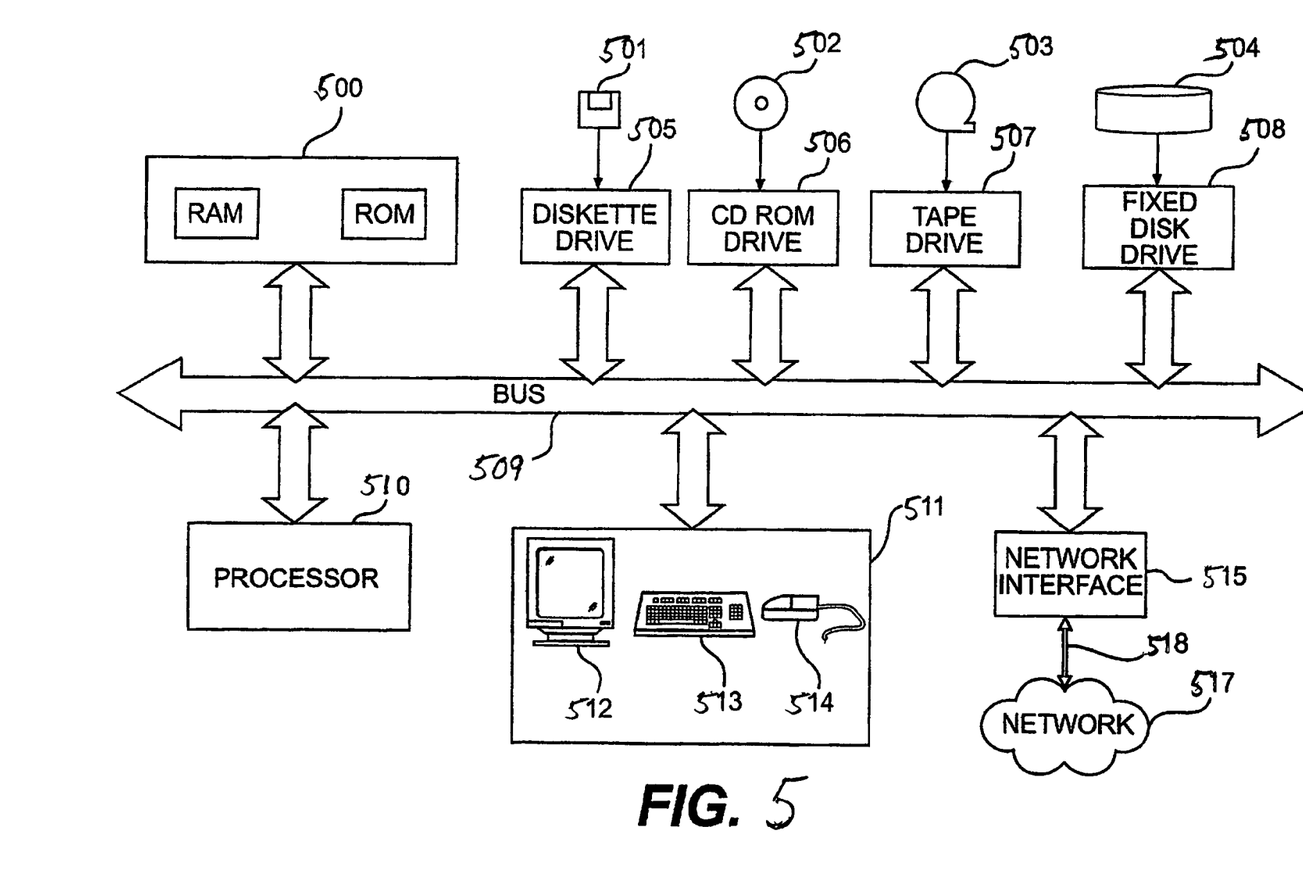
FIG. 5 shows a system for implementing embodiments of the present invention.

FIG. 5 shows a high-level representation of a computer system for implementing embodiments of the present invention, such as might be realized by a variety of known and commercially available hardware and software elements. The system may comprise a memory 500 including ROM and RAM, processor 510 and user interface 511 comprising a display device 512, keyboard 513 and mouse 514. Elements may communicate via a system bus 509. The system may further comprise a network 517 connected by a network medium 518 and network interface 515.

A computer program or collection of programs comprising computer-executable instructions according to embodiments of the present invention may be stored and transported on machine-readable media such as diskette 501, CD-ROM 502, magnetic tape 503 and fixed disk 504. The computer instructions may be retrieved from the machine-readable media 501-504 using their respective drives 504-508 into memory. 500, and executed by a processor 510. The functionality disclosed hereinabove for performing the embodiments may find specific implementations in a variety of forms, which are considered to be within the abilities of a programmer of ordinary skill in the art after having reviewed the specification.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A computer-implemented method of managing record identifiers, comprising:
   responsive to a request to generate a record identifier for a record according to a sequence of arbitrarily-assigned record identifiers:
   determining a next number in a numeric sequence to be assigned;
   comparing the next number to a rule set governing record identifiers, the rule set including a plurality of rules, each of which governs a mutually-exclusive interval of numeric ranges in the numeric sequence and each of which maps to a respective range of record identifiers;

identifying, from the comparison, an interval in which the next number lies;

converting the next number to a corresponding record identifier according to a conversion defined by a rule associated with the identified interval; and assigning the corresponding record identifier to the record.

2. The computer-implemented method of claim 1, wherein the record identifier comprises multiple fields, including source identifying fields and a field assigned according to claim 1.

3. The computer-implemented method of claim 2, wherein the rule set defines, for each interval, a range of record identifiers that correspond to the interval and format for the record identifiers in the respective interval.

4. The computer-implemented method of claim 3, wherein the record identifiers have a predetermined character length and the rule set define formats at each character position therein.

5. The computer-implemented method of claim 4, wherein the converting comprises iteratively, at each character position of the record identifier:

determining a number of permissible characters that can be assigned for the record identifier at the respective position, performing a modulo division of a remainder value by the number of permissible characters, resulting in a modulus value and a subsequent remainder value, converting the modulus value to a character of the record identifier, and repeating the determining, performing and converting operations on the subsequent remainder value in a subsequent iteration;

wherein the next number is used as the remainder value of a first iteration.

6. The computer-implemented method of claim 1, wherein the rule sets define each interval by respective start and end points of record identifier values.

7. The computer-implemented method of claim 6, wherein the converting comprises iteratively, at each character position of the record identifier:

determining from the start and end point of the identified interval a number of permissible characters that can be assigned for the record identifier at the respective position, performing a modulo division of a remainder value by the number of permissible characters, resulting in a modulus value and a subsequent remainder value, converting the modulus value to a character of the record identifier, and repeating the determining, performing and converting operations on the subsequent remainder value in a subsequent iteration;

wherein the next number is used as the remainder value of a first iteration.

8. The computer-implemented method of claim 6, wherein the start and end points each are expressed in the rule sets as combinations of alphabetic characters.

9. The computer-implemented method of claim 6, wherein the start and end points each are expressed in the rule sets as combinations of numeric characters.

10. The computer-implemented method of claim 6, wherein the start and end points each are expressed in the rule sets as combinations of alphabetic and numeric characters.

11. A machine-readable medium comprising computer-executable instructions to:

determine, in response to a request to generate a record identifier for a record according to a sequence of arbitrarily-assigned record identifiers, a next number in a numeric sequence to be assigned;

compare the next number to a rule set governing record identifiers, the rule set including a plurality of rules, each of which governs a mutually-exclusive interval of numeric ranges in the numeric sequence and each of which maps to a respective range of record identifiers;

identify, from the comparison, an interval in which the next number lies;

convert the next number to a corresponding record identifier according to a conversion defined by a rule associated with the identified interval; and assign the record identifier to the record.

12. The medium of claim 11, wherein the rule set defines, for each interval, a range of record identifiers that correspond to the interval and format for record identifiers in the respective interval.

13. The medium of claim 12, wherein the record identifiers have a universal character length for all intervals and the rule set define formats at each character position therein.

14. The medium of claim 13, wherein the conversion comprises iteratively, at each character position of the record identifier:

determining a number of permissible characters that can be assigned for the record identifier at the respective position, performing a modulo division of a remainder value by the number of permissible characters, resulting in a modulus value and a subsequent remainder value, converting the modulus value to a character of the record identifier, and repeating the determining, performing and converting operations on the subsequent remainder value in a subsequent iteration;

wherein the next number is used as the remainder value of a first iteration.

15. The medium of claim 11, wherein the rule sets define each interval by respective start and end points of record identifier values.

16. The medium of claim 15, wherein the conversion comprises:

iteratively, at each character position of the record identifier:

determining from the start and end point of the identified interval a number of permissible characters that can be assigned for the record identifier at the respective position, performing a modulo division of a remainder value by the number of permissible characters, resulting in a modulus value and a subsequent remainder value, converting the modulus value to a character of record field identifier, and repeating the determining, performing and converting operations on the subsequent remainder value in a subsequent iteration;

wherein the next number is used as the remainder value of a first iteration.

17. The computer-implemented method of claim 1, wherein the next number is of a first format and the respective ranges of record identifiers are of respective formats, each respective format different from the first format.

18. The computer-implemented method of claim 1, wherein the rule set comprises:
   a rule in which an interval of numeric range map to a respective range of record identifiers of numeric characters,
   a rule in which an interval of numeric range map to a respective range of record identifiers of alphabetic characters, and
   a rule in which an interval of numeric range map to a respective range of record identifiers of alphanumeric combination of characters.

19. The computer-implemented method of claim 1, wherein the rules of the rule set are set by a user.

20. The computer-implemented method of claim 1, wherein the rule set is a stored table.

* * * * *

UNITED STATES PATENT AND TRADEMARK OFFICE
CERTIFICATE OF CORRECTION

| | | |
|---|---|---|
| PATENT NO. | : 7,660,801 B2 | Page 1 of 1 |
| APPLICATION NO. | : 10/863354 | |
| DATED | : February 9, 2010 | |
| INVENTOR(S) | : Muno et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 444 days.

Signed and Sealed this

Thirtieth Day of November, 2010

David J. Kappos
*Director of the United States Patent and Trademark Office*